(12) United States Patent
Choi et al.

(10) Patent No.: US 8,600,380 B2
(45) Date of Patent: Dec. 3, 2013

(54) SYSTEM OF WI-FI TERMINALS AND CHANNEL OPERATION METHOD FOR THE SAME

(75) Inventors: Jong Mu Choi, Gunpo-si (KR); You Na Lee, Suwon-si (KR); Jhong Il Kim, Suwon-si (KR); Jun Ho Lee, Yongin-si (KR); Jung Hun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 13/107,103

(22) Filed: May 13, 2011

(65) Prior Publication Data

US 2011/0281556 A1 Nov. 17, 2011

(30) Foreign Application Priority Data

May 13, 2010 (KR) .......................... 10-2010-0045105

(51) Int. Cl.
*H04W 4/00* (2009.01)
(52) U.S. Cl.
USPC ........... 455/434; 455/410; 455/411; 455/450; 370/242; 370/254; 370/329; 370/338; 713/168; 713/178; 713/182; 713/184; 726/3; 726/4
(58) Field of Classification Search
USPC .......... 455/410, 411, 450, 434; 370/242, 254, 370/338, 329; 713/168–171, 178, 182, 184; 726/3, 4
See application file for complete search history.

(56) References Cited

U.S. PATENT DOCUMENTS

| 2008/0089300 | A1  | 4/2008 | Yee |
| 2008/0101324 | A1* | 5/2008 | Stark ............................. 370/345 |
| 2011/0075589 | A1* | 3/2011 | Bradley et al. ................. 370/254 |

FOREIGN PATENT DOCUMENTS

| EP | 1 962 457 A2 | 8/2008 |
| EP | 2 112 844 A2 | 10/2009 |
| KR | 10-2004-0097829 A | 11/2004 |
| KR | 10-0665329 B1 | 12/2006 |
| KR | 10-2009-0030629 A | 3/2009 |

OTHER PUBLICATIONS

Wi-Fi Alliance: "Wi-Fi Certified for Wi-Fi Protected Setup: Easing the User Experience for Home and Small Office Wi-Fi Networks", Internet Citation, 2007, pp. 1-14, XP002567243.

* cited by examiner

*Primary Examiner* — Wayne Cai
(74) *Attorney, Agent, or Firm* — Jefferson IP Law, LLP (57) ABSTRACT

A system of Wi-Fi terminals and a channel operation method for the same are provided. The method includes selecting a user function of a sending terminal including a Wi-Fi module, determining whether the selected user function is a Wi-Fi related function, performing, when the selected user function is the Wi-Fi related function, by the sending terminal, a search for a terminal capable of handling the user function, selecting, by the sending terminal, a found terminal as a receiving terminal, automatically establishing, by the sending terminal, a Wi-Fi channel to the receiving terminal by automatically sending a Probe Request message containing a Personal Identification Number (PIN) code, sending, by the sending terminal, data generated by the user function to the receiving terminal through the Wi-Fi channel, and outputting, by the receiving terminal, the received data.

15 Claims, 5 Drawing Sheets

| OUI | LEN | ID | VER | TYPE | VALUE | SERVICE PROTOCOL TYPE |
|---|---|---|---|---|---|---|
| <301> | <303> | <305> | <307> | <309> | <311> | <313> |

SYSTEM OF WI-FI TERMINALS AND CHANNEL OPERATION METHOD FOR THE SAME

PRIORITY

This application claims the benefit under 35 U.S.C. §119(a) of a Korean patent application filed on May 13, 2010 in the Korean Intellectual Property Office and assigned Serial No. 10-2010-0045105, the entire disclosure of which is hereby incorporated by reference.

BACKGROUND OF THE INVENTION

1. Field of the Invention

The present invention relates to a system of Wi-Fi terminals. More particularly, the present invention relates to a system of Wi-Fi terminals and a channel operation method for the same that automatically establish a Wi-Fi communication channel and automatically perform subsequent operations after an occurrence of a channel setup failure, to thereby support rapid and convenient Wi-Fi operations.

2. Description of the Related Art

Mobile terminals supporting mobility and various functions have been widely popularized. Mobile communication terminals and Personal Digital Assistants (PDA) are representative examples of mobile terminals. A mobile communication terminal equipped with a wireless communication module may send and receive voice and non-voice data to and from another mobile communication terminal via a base station. A personal digital assistant including a central processing unit, a memory, an operating system, and programs and devices running on the operating system may perform various operations related to information collection, storage, editing, and search.

A mobile terminal having a Wi-Fi module may connect to a server on the Internet via a nearby Access Point (AP), and may connect to a Wi-Fi device having an AP unit for data transmission and reception. For Wi-Fi operation, a mobile terminal having a Wi-Fi module performs a channel setup procedure with another mobile terminal having a Wi-Fi module. However, during channel setup, the two mobile terminals may be unable to perform other user operations. That is, to setup a Wi-Fi channel, both the requesting mobile terminal and the responding mobile terminal must perform a separate operation to permit channel setup, but may be unable to support other user functions before completion of the separate operation. Additionally, the mobile terminals may fail to establish a channel when the separate operation does not generate an accurate signal for channel setup. Hence, a system of Wi-Fi terminals and an operation method for the same are needed to support flexible channel setup.

SUMMARY OF THE INVENTION

Aspects of the present invention are to address at least the above-mentioned problems and/or disadvantages and to provide at least the advantages described below. Accordingly, an aspect of the present invention is to provide a system of Wi-Fi terminals and a channel operation method for the same that automatically perform Wi-Fi channel setup independently of normal operations to thereby support other user functions during channel establishment and enable easy channel setup.

Another aspect of the present invention is to provide a system of Wi-Fi terminals and a channel operation method for the same that enable terminals attempting Wi-Fi channel setup to automatically restore previous states in the event of channel setup failure.

In accordance with an aspect of the present invention, a system of Wi-Fi terminals is provided. The system includes a sending terminal for activating a Wi-Fi related function in response to a selection of a user function and for automatically sending messages required for Wi-Fi channel setup to a terminal specified by a preset condition or an input signal, and a receiving terminal for automatically responding to messages from the sending terminal to establish a Wi-Fi channel with the sending terminal, for receiving data of the user function from the sending terminal, and for outputting the received data.

In accordance with another aspect of the present invention, a channel operation method for a system of Wi-Fi terminals is provided. The method includes selecting a user function of a sending terminal comprising a Wi-Fi module, determining whether the selected user function is a Wi-Fi related function, performing, when the selected user function is a Wi-Fi related function, by the sending terminal, a search for one or more terminals capable of handling the user function, selecting, by the sending terminal, at least one found terminal as a receiving terminal, automatically establishing, by the sending terminal, a Wi-Fi channel to the receiving terminal by automatically sending a Probe Request message containing a Personal Identification Number (PIN) code, sending, by the sending terminal, data generated by the user function to the receiving terminal through the Wi-Fi channel, and outputting, by the receiving terminal, the received data.

In a feature of the present invention, Wi-Fi terminals may automatically perform Wi-Fi channel setup and support other user functions during channel establishment. Hence, a Wi-Fi channel can be set up easily and rapidly, and users can continue to perform other tasks during channel establishment.

The Wi-Fi terminals may rapidly return to normal operation in the event of channel setup failure.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
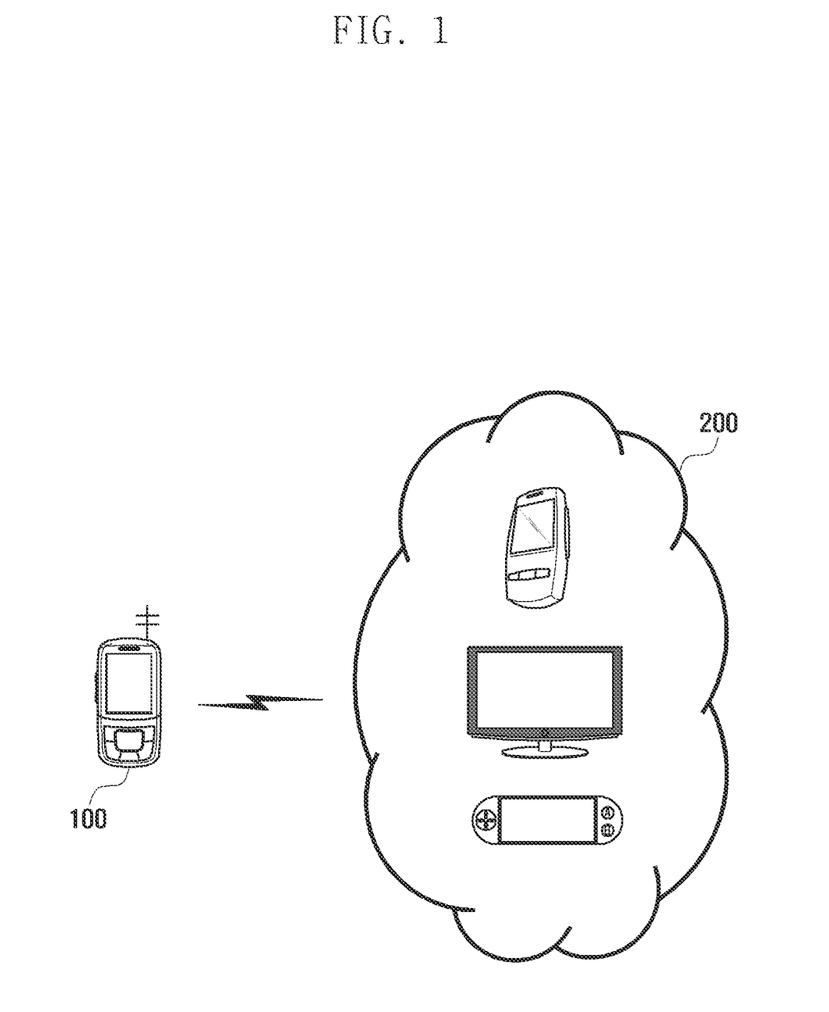
FIG. 1 illustrates a system of Wi-Fi terminals according to an exemplary embodiment of the present invention.

FIG. 1 illustrates a system of Wi-Fi terminals according to an exemplary embodiment of the present invention.

Referring to FIG. 1, the system of Wi-Fi terminals may include a sending terminal 100 and one or more receiving terminals 200. A receiving terminal 200 may be an electronic device having a Wi-Fi module such as a music player, monitor or gaming console. In the description, one or more such devices may be used as the receiving terminal 200.

In the system having the above configuration, when the user of the sending terminal 100 generates an input signal to activate a specific user function, the sending terminal 100 determines whether the user function is a Wi-Fi related function. When the user function is a Wi-Fi related function or when the input signal invokes a Wi-Fi related function, the system supports automatic establishment of a Wi-Fi channel between the sending terminal 100 and the receiving terminal 200. To achieve this, the sending terminal 100 automatically creates a specified code such as a Personal Identification Number (PIN) and sends a message containing the PIN to the receiving terminal 200 to set up a Wi-Fi channel. In the system, the sending terminal 100 may establish a Wi-Fi channel to the receiving terminal 200 without additional user control during channel setup, thus facilitating and expediting user operation. When a message required for channel setup is not received from the sending terminal 100 within a preset time, the receiving terminal 200 may determine channel setup failure and send a channel setup failure message to the sending terminal 100. Upon reception of the channel setup failure message, the sending terminal 100 may request that the user decide whether to reattempt Wi-Fi channel setup or may output a channel setup failure notification. After occurrence of channel setup failure, the receiving terminal 200 may stop waiting for Wi-Fi channel setup and perform a function according to a preset schedule. The receiving terminal 200 may also output a channel setup failure notification to the user. Next, a more detailed description is given of the sending terminal 100 and the receiving terminal 200 in the system.

The sending terminal 100 includes a Wi-Fi module acting as a master or station for Wi-Fi based search and may search for a receiving terminal 200 according to user control. In this process, according to user settings, the sending terminal 100 may create a list of terminals (for example, terminals manufactured by a given company) and select a terminal of the list conforming to the user function as a receiving terminal 200. To support a specified user function when multiple terminals are discovered, the sending terminal 100 may select one of the discovered terminals as a receiving terminal 200 or may select two or more thereof as receiving terminals 200, according to user settings and conduct channel setup. After channel establishment, the sending terminal 100 may automatically transfer data associated with the user function to the receiving terminal 200. Hence, the sending terminal 100 enables rapid and easy execution of a selected user function. As the Wi-Fi module includes a reception function, the sending terminal 100 may act as a receiving terminal 200 in some cases.

After sending a message for automatic channel setup to the receiving terminal 200, the sending terminal 100 receives a response message from the receiving terminal 200. The sending terminal 100 may fail to send a next message of the received response message for various reasons, and may receive a message indicating termination of automatic channel setup from the receiving terminal 200. The sending terminal 100 may output the message indicating termination of automatic channel setup to the display unit to notify the user of failure of automatic Wi-Fi channel setup. Thereafter, the sending terminal 100 may display the idle screen or resume a previously stopped task according to a preset schedule.

The receiving terminal 200 includes a Wi-Fi module acting as a slave or Access Point (AP) and sends a response message to the sending terminal 100 in reply to a received probe request message for Wi-Fi channel setup. The receiving terminal 200 receives data from the sending terminal 100 and outputs the received data under control of the sending terminal 100. Independently from a request of the sending terminal 100, the receiving terminal 200 may also broadcast its information to the outside at regular intervals. In particular, the receiving terminal 200 may start a Wi-Fi Protected Setup (WPS) timer after sending a response message in reply to a request message for channel setup received from the sending terminal 100. Here, the WPS timer may be set to a predetermined time period (for example, 3 to 5 seconds) to reduce Wi-Fi channel setup delay. This timer value may be determined on the basis of estimation of the time required for automatic transmission of a response message by the receiving terminal and for automatic transmission of a request message corresponding to the response message by the sending terminal.

As described above, in the system of Wi-Fi terminals, when a specific user function is activated, the sending terminal 100 may automatically set up a Wi-Fi channel with a receiving terminal 200 supporting the user function. The procedure for Wi-Fi channel setup is performed automatically in the background without separate user intervention, avoiding system delay due to Wi-Fi channel setup and thus supporting effective multitasking. In addition, the receiving terminal 200 activates a timer (set to a predetermined period, for example, several seconds) after receiving a request message for Wi-Fi channel setup from the sending terminal 100, significantly reducing a wait time for Wi-Fi channel setup of the sending terminal 100 and the receiving terminal 200.

Next, a description is given of the configuration of the sending terminal 100 and the receiving terminal 200. Here, the receiving terminal 200 includes a Wi-Fi module acting as a master (station) and a slave (AP). As described previously, when the sending terminal 100 includes a Wi-Fi module acting as a slave (AP), it may also operate as a receiving terminal. Hence, for ease of description, the sending terminal 100 and the receiving terminal 200 are depicted as having the same configuration. However, the present invention is not limited thereto. For example, the sending terminal 100 and the receiving terminal 200 may each be composed of different components except for the Wi-Fi module acting as a master and a slave.

Figure 2:
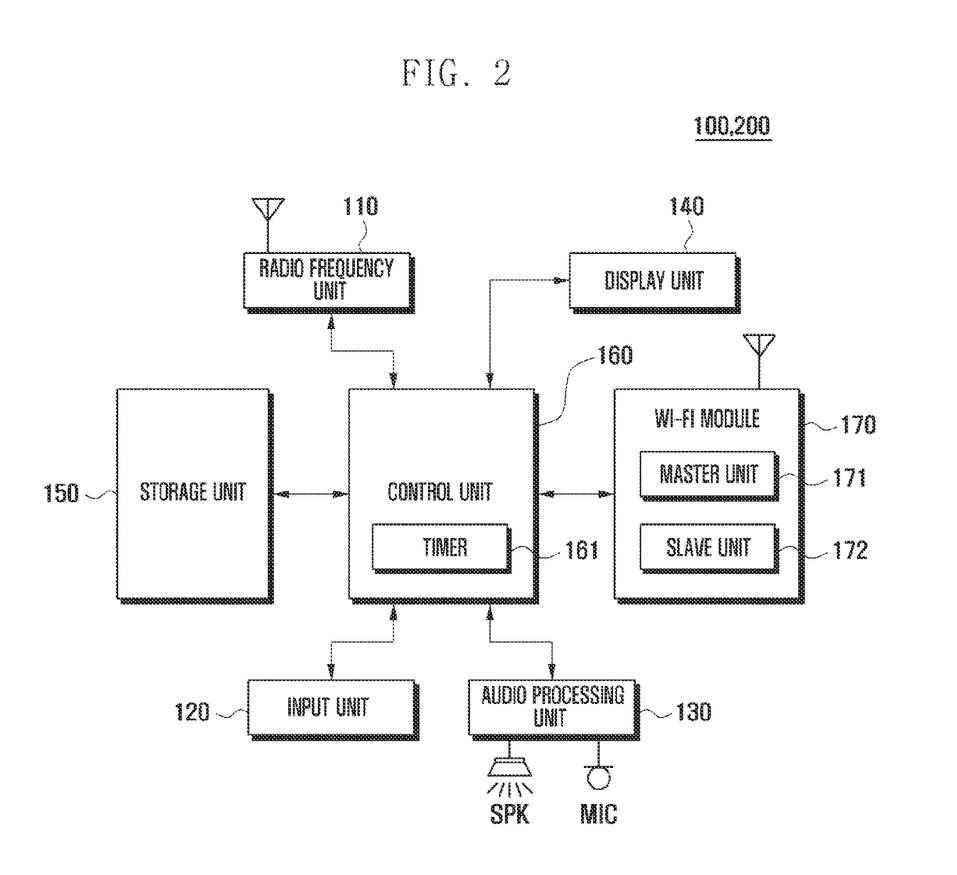
FIG. 2 is a block diagram of a sending terminal and a receiving terminal in the system of FIG. 1.

FIG. 2 is a block diagram of a sending terminal 100 and a receiving terminal 200 in the system of FIG. 1 according to an exemplary embodiment of the present invention.

Referring to FIG. 2, each of the sending terminal 100 and the receiving terminal 200 may include a Radio Frequency (RF) unit 110, an input unit 120, an audio processing unit 130, a display unit 140, a storage unit 150, a Wi-Fi module 170, and a control unit 160. As described above, the sending terminal 100 and the receiving terminal 200 are assumed for this example to have the same configuration.

When the user generates an input signal to activate a Wi-Fi related user function, the sending terminal 100 may conduct a search for a receiving terminal 200 associated with the user function, select a found Wi-Fi terminal as the receiving terminal 200 according to a preset condition or according to an input from the input unit 120, automatically set up a Wi-Fi channel to the receiving terminal 200, and send data associated with the activated user function through the Wi-Fi channel. Hence, the sending terminal 100 sends data generated by a user function through a Wi-Fi channel to the receiving terminal 200, which then readily processes the user data. In this process, the sending terminal 100 uses a master unit 171 of the Wi-Fi module 170 to automatically send a request message for channel setup to the receiving terminal 200. The receiving terminal 200 uses a slave unit 172 of the Wi-Fi module 170 to receive the request message and to send a response message to the sending terminal 100. Next, individual components of the sending terminal 100 and the receiving terminal 200 will be described.

The radio frequency unit 110 is a communication module providing mobile communication services to the sending terminal 100 or to the receiving terminal 200. The radio frequency unit 110 may be a Global System for Mobile Communications (GSM) based module or a Code Division Multiple Access (CDMA) based module according to a mobile communication scheme, and may establish a communication channel to a mobile communication system. To achieve this, the radio frequency unit 110 may include a radio frequency transmitter for upconverting the frequency of a signal to be transmitted and for amplifying the signal, and a radio frequency receiver for low-noise amplifying a received signal and for downconverting the frequency of the received signal. The radio frequency unit 110 need not be included in the sending terminal 100 or the receiving terminal 200 according to terminal type. That is, if the sending terminal 100 and the receiving terminal 200 support mobile communication based on a base station, the radio frequency unit 110 is included therein. If the sending terminal 100 and the receiving terminal 200 are, for example, music players not supporting mobile communication, the radio frequency unit 110 need not be included therein.

The input unit 120 includes a plurality of alphanumeric and function keys for inputting alphanumeric information and for setting various functions. The function keys may include direction, side, and shortcut keys associated with specific functions. The input unit 120 generates a key signal for user settings and terminal control and forwards the key signal to the control unit 160. In particular, according to user input, the input unit 120 generates an input signal for selecting the Wi-Fi module 170 and a user function, an input signal for specifying either an automatic mode or a manual mode to select a receiving terminal, and an input signal for selecting at least one of the found terminals as the receiving terminal in manual mode.

The audio processing unit 130 may include a speaker SPK for outputting an audio signal from the control unit 160, and a microphone MIC for collecting an audio signal according to activation of an application program. When the radio frequency unit 110 is activated, the audio processing unit 130 outputs an audio signal received by the radio frequency unit 110. In particular, the audio processing unit 130 of the sending terminal 100 may transfer a generated audio signal to the receiving terminal 200 via the Wi-Fi module 170 under control of the control unit 160; and the audio processing unit 130 of the receiving terminal 200 may output the audio signal from the Wi-Fi module 170 of the sending terminal 100.

The display unit 140 displays various menus, information input by the user, and information to be provided to the user. For example, the display unit 140 may output various screens related to utilization of the terminal, such as an idle screen, menu screen, message composition screen, and call handling screen. In particular, the display unit 140 may display a Wi-Fi channel setup screen according to activation of the Wi-Fi module 170. The Wi-Fi channel setup screen may be hidden from the display unit 140 when Wi-Fi channel setup is processed in the background according to user settings. The display unit 140 of the sending terminal 100 may output a list of communicable terminals or a list of terminals manufactured by a specific manufacturer according to user settings. When automatic Wi-Fi channel setup is completed, the display unit 140 may output a message indicating completion of channel setup as a popup or on the screen. The display unit 140 may output a screen for data sent and received by the terminal. When a message indicating automatic channel setup failure is received from the receiving terminal 200, the display unit 140 of the sending terminal 100 may output the received message as a popup or as an image. Hence, the user may recognize failure of automatic channel setup between the sending terminal 100 and the receiving terminal 200. As automatic Wi-Fi channel setup is processed in the background, the Wi-Fi channel setup screen need not be displayed on the display unit 140. Hence, the display unit 140 of the sending terminal 100 may display the idle screen or a currently active screen according to a preset schedule. The display unit 140 may be realized using, for example, Liquid Crystal Display (LCD) devices or Organic Light Emitting Diodes (OLED). When the display unit 140 has a touch-screen capability, it may also act as an input means and may include a display panel and a touch sensor on the display panel. In this case, the display unit 140 may provide various menus related to functions executable by touch gestures. The receiving terminal 200 need not include the display unit 140 according to design.

The storage unit 150 may store application programs related to the present invention and playback of various stored files, and key maps and menu maps for the touch screen capability. The key maps may correspond to various keyboards including a 3*4 keyboard and a QWERTY keyboard, and may include a control key map for controlling execution of a currently active application program. The menu maps may include a menu map for controlling execution of a currently active application program, and a menu map related to the menus of the terminal. The storage unit 150 may include a program region and a data region.

The program region may store an Operating System (OS) for booting the terminal and operating the components thereof, and application programs for reproduction of various files, for playback of Motion Picture Experts Group 2—Audio Layer III (MP3) data, for viewing still images, and for playback of moving images. In particular, the program region may store an automatic channel setup program and an automatic recovery program to support automatic establishment of a Wi-Fi channel.

In the sending terminal 100, the automatic channel setup program enables a selected user function to be executed with the help of a receiving terminal 200 capable of communicating via a Wi-Fi channel. To achieve this, the automatic channel setup program includes a routine for determining whether an activated user function is to be executed using Wi-Fi, a routine for searching for terminals to establish a Wi-Fi channel, a routine for selecting at least one found terminal as the receiving terminal 200 according to a preset condition or user input, a routine for automatically setting up a Wi-Fi channel to the selected receiving terminal 200, and a routine for sending data of the user function to the receiving terminal 200.

The search routine may include a subroutine for broadcasting a message to find all terminals capable of communicating with the sending terminal 100, and a subroutine for collecting information about terminals by receiving messages broadcast by the terminals at regular intervals. The selection routine may include a subroutine for selecting the receiving terminal 200 according to intensities of signals received from the found terminals, a subroutine for selecting the receiving terminal 200 according to usage histories, and a subroutine for outputting a list of found terminals to support user selection. The automatic setup routine may include a subroutine for automatically creating, for example, a PIN code, a subroutine for sending a message containing the PIN code to the receiving terminal 200, and a routine for channel establishment according to a response message from the receiving terminal 200.

In the receiving terminal 200, the automatic channel setup program may include a routine for broadcasting terminal information at regular intervals, a routine for sending a response message in reply to a message from the sending terminal 100, a routine for automatically setting up a channel according to control of the sending terminal 100, and a routine for outputting data received from the sending terminal 100. The automatic channel setup program is loaded in the control unit 160 of each of the sending terminal 100 and the receiving terminal 200 to support Wi-Fi channel establishment and data output.

In the receiving terminal 200, the automatic recovery program may include routines to be invoked when a required message is not received from the sending terminal 100 within a preset time. That is, the automatic recovery program may include a routine for starting a timer (auto provision timer) after sending a probe response message to the sending terminal 100 in reply to an auto probe request sent by the sending terminal 100, a routine for examining whether a WPS start message is received from the sending terminal 100 before expiration of the timer, a routine for creating, when a WPS start message is not received, a corresponding message and sending the created message to the sending terminal 100, and a routine for sending, when a channel setting message is not received, a corresponding message and restoring the previously stopped task.

In the sending terminal 100, the automatic recovery program may include routines for notifying the user, when a reply message indicating failure of message reception is received from the receiving terminal 200, of the corresponding failure and restoring the previously stopped task. That is, the automatic recovery program may include a routine for activating various output means, such as a popup and an image, to notify channel setup failure, and a routine for resuming a previously stopped user function according to scheduling information.

The data region is an area that stores data generated in the course of using the terminal, and may selectively store various contents according to a terminal type. When the display unit 140 has a touch-screen capability, the data region may store user data input through the touch screen. In particular, the data region may store a list of user functions supported by automatic Wi-Fi channel setup, information specifying manual or automatic selection of a receiving terminal, and information required for searching for terminals manufactured by a specific manufacturer. The list of user functions is used as a reference to determine whether a selected user function is to be executed using Wi-Fi, and is editable by the user. Hence, the user may insert a specific user function to be automatically supported by Wi-Fi to the list, and may delete a specific user function not to be supported by Wi-Fi from the list. The sending terminal 100 may provide a function enabling the user to edit the list of user functions. The information specifying manual selection of a receiving terminal may be temporarily stored information regarding terminals found by the activated search routine. The information specifying automatic selection of a receiving terminal is information enabling automatically determining which of the found terminals will be the receiving terminal 200. The information specifying automatic selection may include information on the threshold intensity for received signals, and information regarding terminals having been connected or recently connected, and may be utilized upon activation of the selection routine. In the receiving terminal 200, the data region may store manufacturer information. Such stored information is described further in connection with FIG. 3.

The Wi-Fi module 170 may include a master unit 171 and a slave unit 172, or include one thereof according to the role of the terminal. That is, when included in the sending terminal 100, the Wi-Fi module 170 may include the master unit 171; and when included in the receiving terminal 200, the Wi-Fi module 170 may include the slave unit 172. Alternatively, each terminal may include a Wi-Fi module 170 composed of both the master unit 171 and the slave unit 172, and operate one of the master unit 171 and the slave unit 172 according to the current role. The Wi-Fi module 170 may create a message for Wi-Fi channel setup and send the created message, or may receive a message for Wi-Fi channel setup under control of the control unit 160. The Wi-Fi module 170 may be activated by the automatic channel setup program stored in the storage unit 150 or by direct user control to support automatic channel setup and data transmission. The Wi-Fi module 170 may be deactivated by the automatic recovery program. The Wi-Fi module 170 may be operated in the background. Required messages in accordance with this exemplary embodiment are described with reference to FIG. 3.

The control unit 160 controls the supply of power to the components of the terminal and performs an initialization procedure. After initialization, according to a user request, the control unit 160 may control the Wi-Fi module 170 to automatically set up a Wi-Fi channel. The control unit 160 may include a timer 161 for Wi-Fi channel setup. The timer 161 may be used when the terminal is acting as a receiving terminal. That is, the receiving terminal 200 may start the timer 161 after sending a probe response message in reply to a probe request message received from the sending terminal 100.

The control unit 160 may use the timer 161 to set a duration during which the sending terminal 100 must send the next message after reception of the probe response message. That is, when a WPS start message is received from the sending terminal 100 before expiration of the timer 161, the receiving terminal 200 proceeds with normal channel setup; and when a WPS start message is not received before expiration of the timer 161, the receiving terminal 200 regards this as a channel setup failure, transitions to the idle state or restores the previous task, and sends a message indicating channel setup failure to the sending terminal 100. Automatic channel setup and automatic recovery performed by the control unit 160 are described in detail later in connection with FIGS. 4 to 6.

Figure 3:
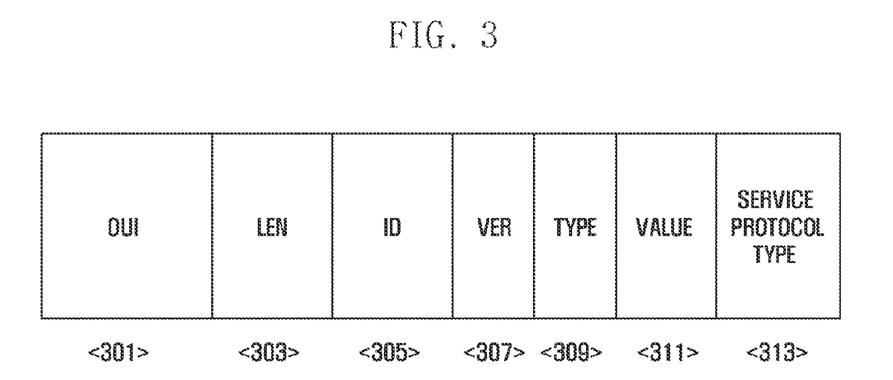
FIG. 3 illustrates a format of messages used according to an exemplary embodiment of the present invention.

FIG. 3 illustrates a format of messages used according to an exemplary embodiment of the present invention. In the following description, the message is assumed to be a response message sent by the receiving terminal 200 to the sending terminal 100. Each field of the response message may be adjusted so as to have a specific value for automatic Wi-Fi channel setup.

Referring to FIG. 3, a response message may include an Organizationally Unique Identifier (OUI) field 301, a length "LEN" field 303, an "ID" field 305, a version "VER" field 307, a type field 309, a value field 311, and a "service protocol type" field 313. The OUI field 301 stores an Organizationally Unique Identifier of a specific manufacturer (for example, Samsung Electronics has an OUI of "00 00 F0"). Each manufacturer has a unique OUI. The "LEN" field 303 specifies the total length of the response message. The "ID" field 305 is used to prevent duplication of OUIs and the field value is to be determined. The version field 307 is a field for extension and may be defined according to changes in Wi-Fi messages. The type field 309 indicates a type of the response message. For example, type field values "0000", "0001", "0010", and "0011" may be used to indicate "resolved", "advertise", "WPS start request", and "WPS response", respectively. The value field 311 indicates a category and subcategory of the receiving terminal 200. For example, the value field 311 may indicate that the receiving terminal 200 is an audio player among audio devices. The categories and subcategories may be defined by classifying electronic devices in advance. The "service protocol type" field 313 indicates a type of the wireless protocol carrying response messages. For example, field values "00000000", "00000001", "00000010", "00000011", and "11111111" may be used to indicate "All Service Protocol Type", "Bonjour", "UPnP", "WS-Discovery", and "Vendor Specific", respectively, and other values may be reserved.

A response message having an "OUI" field 301 containing a pre-specified value may indicate the manufacturer of the sending terminal 100 or the receiving terminal 200. Hence, the sending terminal 100 may send a message to search for terminals manufactured by a specific manufacturer, and a receiving terminal 200 may send a response message having a desired "OUI" field value to the sending terminal 100. Here, the sending terminal 100 broadcasts a probe message having a specific "OUI" field value.

As described before, for automatic channel setup, the sending terminal 100 may adjust some fields of a request message. More specifically, in composition of a probe request message for automatic channel setup, the sending terminal 100 may set the "OUI" field 301 of the message to "WPS start request" to compose a probe request frame. The sending terminal 100 may also insert a PIN code for the WPS-PIN procedure in the value field of the WPS start request frame. Here, the PIN code may be an automatically generated value. Instead of broadcasting the probe request frame, the sending terminal 100 may unicast the probe request frame to a receiving terminal 200, which may be directly selected by the user or automatically selected according to a preset condition, using the Basic Service Set Identifier (BSSID) of the receiving terminal 200. Here, the BSSID may be a unique identification number of the receiving terminal 200.

The sending terminal 100 may collect information on terminals in at least two ways. First, the sending terminal 100 collects information regarding all communicable terminals, selects terminals providing a desired OUI field value from all the communicable terminals, and creates a list of terminals manufactured by a given manufacturer. Second, the sending terminal 100 may collect information on terminals manufactured by a given manufacturer. To achieve this, the sending terminal 100 sends a probe request message having an OUI field value to terminals; and each terminal checks the OUI field value of the received probe request message and sends a response message to the sending terminal 100 only when the OUI field value is identical to the terminal's OUI.

As described above, the sending terminal 100 may collect information only on terminals manufactured by a specific manufacturer by using an OUI field value and may support Wi-Fi channel setup on the basis of the collected information. Creation of a list of terminals manufactured by a specific manufacturer enables easy and rapid search for a desired electronic device and significantly reduces search load of the sending terminal 100. This also reduces the possibility of sending data to the wrong terminal, thereby improving security in data transmission.

Figure 4:
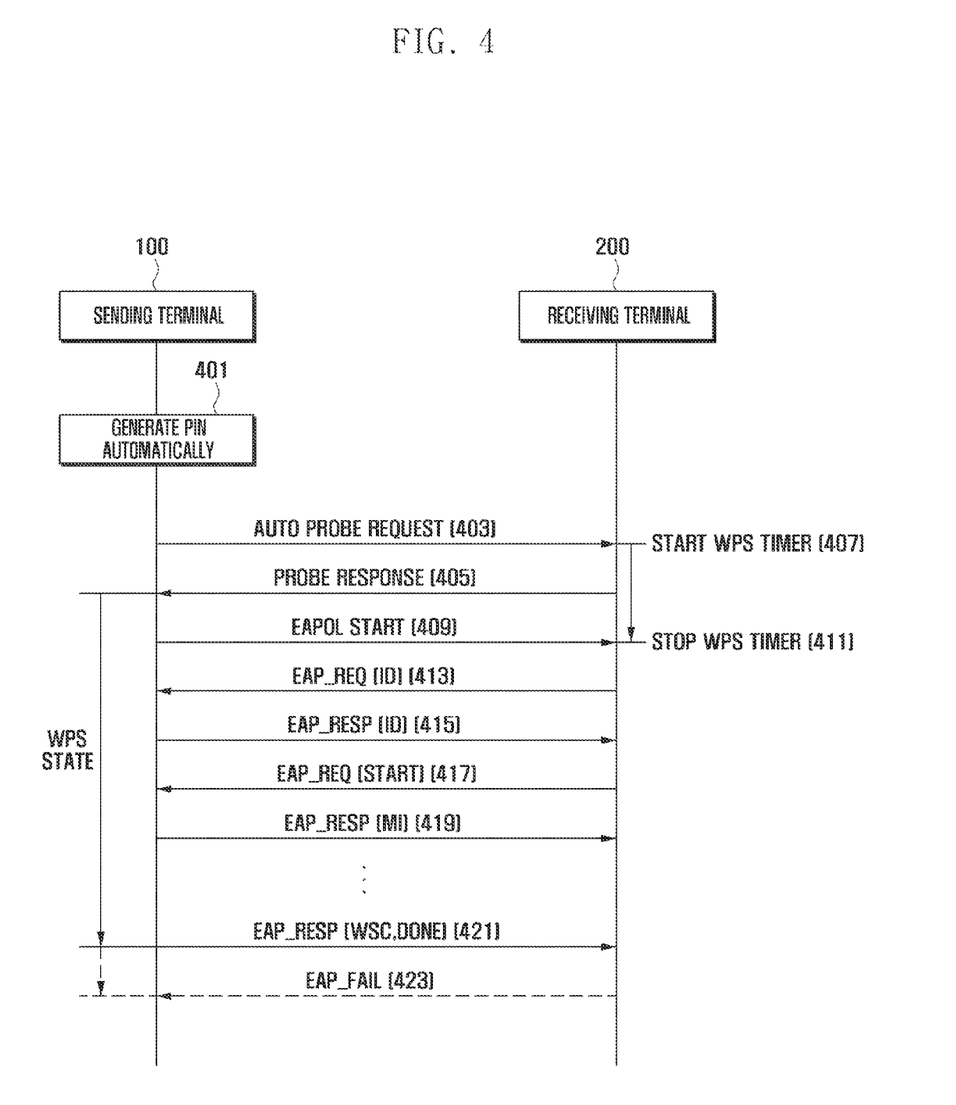
FIG. 4 is a sequence diagram illustrating transmission of messages between Wi-Fi terminals according to an exemplary embodiment of the present invention.

FIG. 4 is a sequence diagram illustrating transmission of messages between Wi-Fi terminals according to an exemplary embodiment of the present invention. In the description, it is assumed that the sending terminal 100 has obtained information on terminals by collecting messages periodically broadcast by the terminals or by sending a probe message and receiving response messages; and the receiving terminal 200 has been selected by a manual procedure of the user or by an automatic procedure according to preset conditions. After selection of the receiving terminal 200 for Wi-Fi channel setup, a required message may be transmitted without separate user intervention at each step.

Referring to FIG. 4, the sending terminal 100 generates, for example, a PIN code at step 401. To achieve this, the sending terminal 100 may have a PIN code generation routine. Thereafter, the sending terminal 100 sends an Auto Probe Request message containing the generated PIN code to the receiving terminal 200 at step 403.

Upon reception of the Auto Probe Request message, the receiving terminal 200 examines the contents of the Auto Probe Request message, creates a corresponding Probe Response message, and sends the Probe Response message to the sending terminal 100 at step 405. Immediately after sending the Probe Response message, the receiving terminal 200 starts the WPS timer at step 407. The WPS timer corresponds to the timer 161 of the control unit 160 and may be set to a period of, for example, 3 to 5 seconds. When a required message for channel setup is not received from the sending terminal 100 before expiration of the WPS timer, the receiving terminal 200 changes states. That is, when a required message for channel setup is not received, as described before, the receiving terminal 200 may enter the idle state or may resume a previously stopped task.

Upon reception of the Probe Request message whose OUI field is set to "WPS start request", the receiving terminal 200 may switch the state of a WPS register to "WPS Walking State," on the basis of the received PIN code. Thereafter, the receiving terminal 200 sends a Probe Response message whose OUI field is set to "WPS Response," notifying the start of the WPS procedure to the sending terminal 100. Upon reception of the Probe Response message whose OUI field is set to "WPS Response," the sending terminal 100 may perform the WPS PIN procedure. After the completion of the WPS PIN procedure, the sending terminal 100 ends data transmission and reception for automatic channel setup and starts to transfer data of the activated user function.

That is, when the Probe Response message is received from the receiving terminal 200, the sending terminal 100 may exchange messages for actual Wi-Fi channel setup with the receiving terminal 200. When a required message is received before the expiration of the timer 161 from the sending terminal 100, the receiving terminal 200 may stop the WPS timer and start the Wi-Fi channel setup. To be more specific, the sending terminal 100 notifies the receiving terminal 200 of the activation of the EAPOL (Extensible Authentication Protocol Over Local Area Network (LAN)) protocol by sending an EAPOL Start signal to the receiving terminal 200 at step 409. Upon reception of the EAPOL Start signal, the receiving terminal 200 stops the WPS timer at step 411 and sends an EAP_Req(ID) message to the sending terminal 100 at step 413. Upon reception of the EAP_Req(ID) message, the sending terminal 100 sends an EAP_Resp(ID) message to the receiving terminal 200 at step 415. The receiving terminal 200 sends an EAP_Req(Start) message to the sending terminal 100 at step 417, and the sending terminal 100 sends an EAP_Resp(MI) message to the receiving terminal 200 at step 419. Thereafter, the sending terminal 100 sends a message required for Wi-Fi channel setup to the receiving terminal 200, and finally sends an EAP_Resp(Wsc_Done) message indicating completion of Wi-Fi channel setup to the receiving terminal 200 at step 421.

At step 413 and subsequent steps, in WPS state operation, when Wi-Fi channel setup is not achievable owing to failure to receive at least one required message from the sending terminal 100, the receiving terminal 200 may send an EAP_Fail message indicating a failure of channel setup to the sending terminal 100 at step 423.

Figure 5:
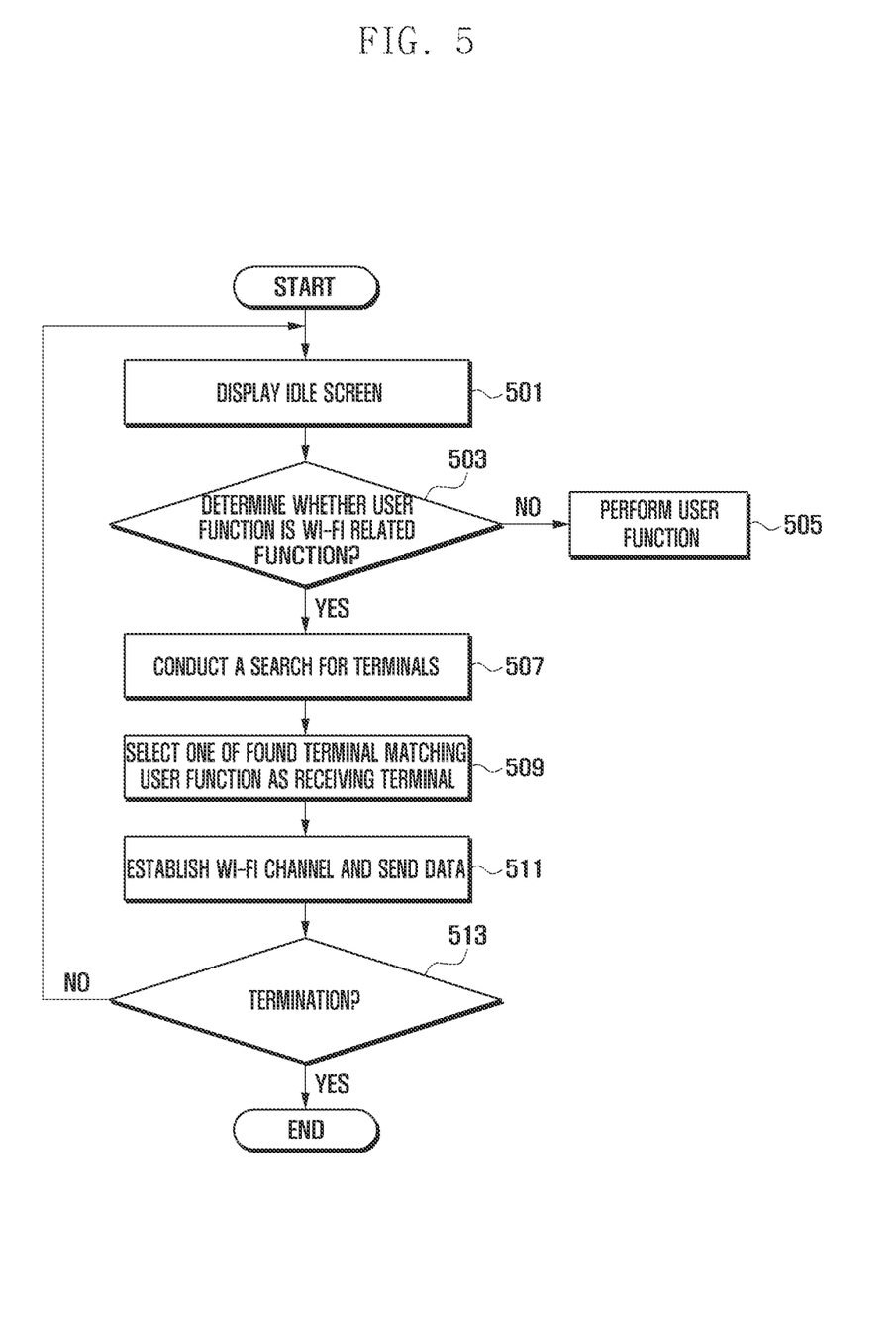
FIG. 5 is a flowchart of an operation method for Wi-Fi channel setup according to an exemplary embodiment of the present invention.

FIG. 5 is a flowchart of an operation method for Wi-Fi channel setup according to an exemplary embodiment of the present invention.

Referring to FIG. 5, in the system of Wi-Fi terminals, the sending terminal 100 and the receiving terminals are turned on and initialized. After initialization, each terminal performs a specific task (for example, displays an idle screen) according to a preset schedule at step 501. At step 501, each terminal may perform various tasks. For example, when a receiving terminal is an audio player that is pre-scheduled to play back a given sound material, the receiving terminal may output audio by playing back the sound material. Similarly, when the sending terminal 100 is pre-scheduled to output a given message or information item, it may output the message or information item as a voice or an image, as appropriate.

When the user of the sending terminal 100 generates an input signal through the input unit 120 to select a particular user function, the control unit 160 of the sending terminal 100 determines whether the selected user function is a Wi-Fi related function at step 503. To achieve this, as described before, the sending terminal 100 may store information on Wi-Fi related user functions in advance. Such information on user functions may be changed or updated according to design or user settings.

If it is determined that the selected user function is not a Wi-Fi related function, the control unit 160 of the sending terminal 100 controls an operation to perform the user function at step 505. Here, the user function may be one of various functions related to voice call, video call, data communication, file playback, DMB reception, file search, etc.

If it is determined that the selected user function is a Wi-Fi related function, the sending terminal 100 conducts a search for terminals matching the user function at step 507. To obtain information on terminals, the sending terminal 100 may broadcast an information request message to all terminals and receive response messages therefrom, or may collect messages periodically broadcast by the terminals. The sending terminal 100 may create a list of found terminals on the basis of the response messages or periodically broadcast messages. Thereafter, the sending terminal 100 selects one of the found terminals matching the user function as the receiving terminal 200 according to a user decision or preset conditions at step 509. That is, when the user generates an input signal for terminal selection, the sending terminal 100 selects the receiving terminal 200 according to the input signal; and when the user does not generate an input signal for terminal selection, the sending terminal 100 automatically selects the receiving terminal 200 according to preset conditions.

After selection of the receiving terminal 200, the sending terminal 100 establishes a Wi-Fi channel to the receiving terminal 200 and sends data associated with the user function to the receiving terminal 200 at step 511.

The sending terminal 100 determines whether a termination request is issued at step 513. When a termination request is not issued, the sending terminal 100 returns to step 501 for continued processing.

At step 503, the sending terminal 100 is described as determining whether the selected user function is a Wi-Fi related function. However, the present invention is not limited thereto. That is, the user may directly generate an input signal to instruct the sending terminal 100 to conduct a particular user function on the basis of a Wi-Fi feature. For example, the user of the sending terminal 100 may select a specific music file and generate an input signal to activate a Wi-Fi feature so that the music file is output through a receiving terminal. Then, the sending terminal 100 may perform step 507 and subsequent steps. In other words, the sending terminal 100 may perform a user function using a Wi-Fi feature either in an automatic way or according to user selection.

In FIG. 5, step 507 and step 509 may be simultaneously performed. To be more specific, to collect information only on terminals matching the selected user function, the sending terminal 100 may broadcast an information request message containing information on a device matching the user function. For example, when the selected user function is music file playback, the sending terminal 100 may broadcast an information request message containing information on a device capable of music file playback. Then, only terminals matching the user function may send a response message to the sending terminal 100. Hence, the sending terminal 100 may select one of the responding terminals satisfying a preset condition as the receiving terminal 200. As described before, the preset condition may control selection of a terminal, capable of handling the current user function, which, for example, exhibits a received signal intensity exceeding a threshold, exhibits a strongest received signal intensity, is frequently used, or is most recently used.

As described above, in the system of Wi-Fi terminals and an operation method thereof that involve selection of a user function and establishment of a Wi-Fi channel in relation to the user function, when a specific receiving terminal 200 is selected according to a user input or a preset condition, the sending terminal 100 may automatically establish a Wi-Fi channel to the receiving terminal 200. During Wi-Fi channel setup, a PIN code may be automatically generated and transmitted, reducing the WPS latency to a fixed time interval. Hence, it is possible to reduce Wi-Fi channel setup delay and enhance Wi-Fi channel setup efficiency.

Figure 6:
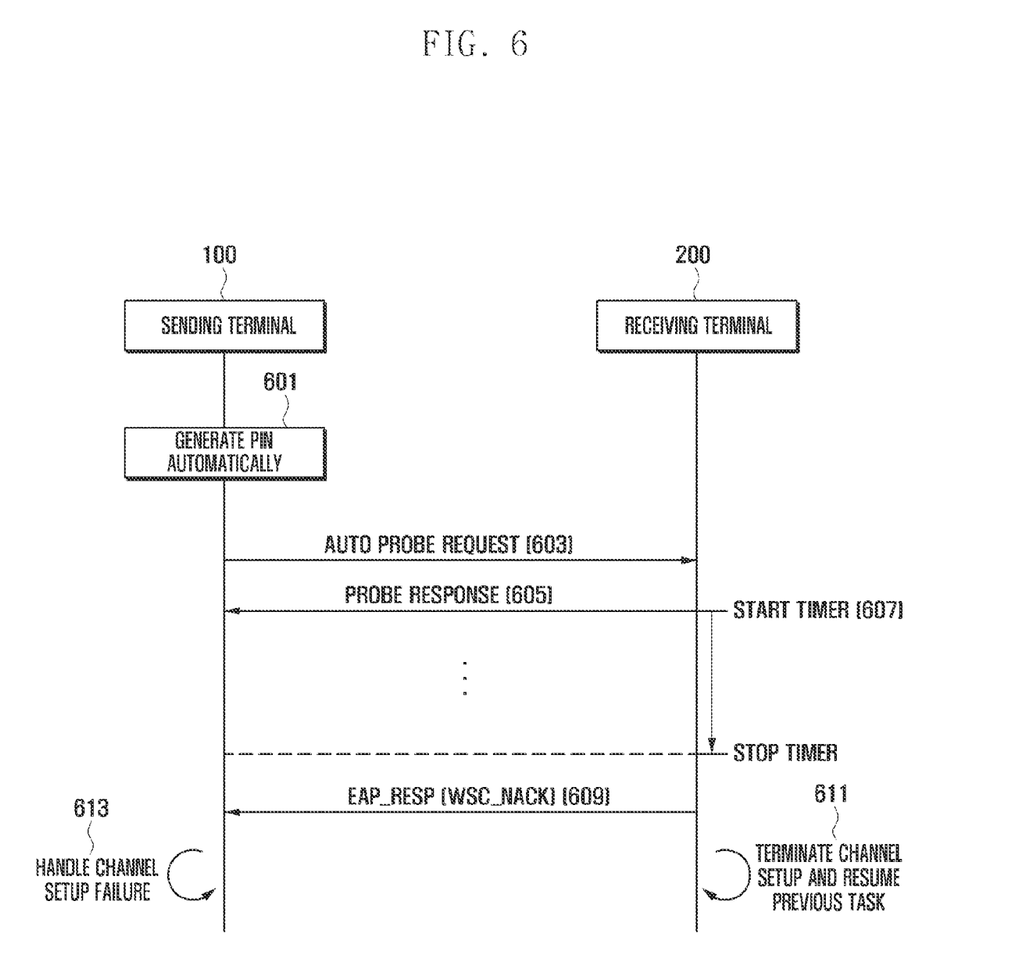
FIG. 6 is a sequence diagram of a procedure for addressing channel setup failure performed by Wi-Fi terminals according to an exemplary embodiment of the present invention.

FIG. 6 is a sequence diagram of a procedure for addressing channel setup failure performed by Wi-Fi terminals according to an exemplary embodiment of the present invention.

Referring to FIG. 6, after selecting a receiving terminal 200 according to a user input signal or a preset condition to perform a user function using a Wi-Fi feature, the sending terminal 100 automatically generates a PIN code at step 601.

The sending terminal 100 sends an Auto Probe Request message containing the PIN code to the receiving terminal 200 at step 603. In reply to the Auto Probe Request message, the receiving terminal 200 sends a Probe Response message to the sending terminal 100 at step 605. After sending the Probe Response message, the receiving terminal 200 starts the timer 161 to reduce Wi-Fi channel setup latency at step 607.

When a separate message is not received before expiration of the timer 161, the receiving terminal 200 may assume channel setup failure. That is, the receiving terminal 200 starts the timer 161 after sending the response message and awaits arrival of a message indicating "WPS Start" from the sending terminal 100 until the timer 161 expires. Here, the timer 161 may be set to several seconds (for example, 3 to 5 seconds) in consideration of the time required for transmission and reception of the Response message and the time required to compose the message indicating "WPS Start" and transmission thereof.

When a required message is not received before expiration of the timer 161, the receiving terminal 200 sends an EAP_Resp(Wsc_NACK) message indicating message reception failure to the sending terminal 100 at step 609, and may terminate the procedure for Wi-Fi channel setup and resume a previously stopped task at step 611.

Upon reception of the EAP_Resp(Wsc_NACK) message, the sending terminal 100 recognizes a channel setup failure and performs a corresponding operation at step 613. For example, the sending terminal 100 may output an alert indicating channel setup failure and resume a previously stopped task. The sending terminal 100 may also output stored information on found terminals as a list on the display unit 140 and enable the user to select another receiving terminal 200.

As described above, in the system of Wi-Fi terminals, the receiving terminal 200 operates the timer 161 to regulate transmission of signals. Hence, the sending terminal 100 and receiving terminal 200 may reduce the latency of Wi-Fi channel setup.

Although not shown, if necessary, each terminal may further include at least one of a short-range communication module for short-range communication, a camera module for capturing still or moving images of a target object, a data communication interface based on wired and wireless communication, an Internet communication module for Internet access, and a digital broadcast receiving module. With the digital convergence trend, it should be apparent to those skilled in the art that the terminal of the present invention may further include a unit comparable to the above-described units, and one unit of the terminal may be removed or replaced with another unit.

The terminal of the present invention may be a Wi-Fi enabled device, and may be any information and communication appliance or multimedia appliance, such as a mobile communication terminal communicating with a communication system via communication protocols, a Portable Multimedia Player (PMP), a digital broadcast receiver, a Personal Digital Assistant (PDA), a music player like an MP3 player, a portable game console, a smart phone, a notebook computer, or a handheld computer.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A channel operation method for a system of Wi-Fi terminals, the method comprising:
   selecting a user function of a sending terminal comprising a Wi-Fi module;
   determining whether the selected user function is a Wi-Fi related function;
   performing, when the selected user function is the Wi-Fi related function, by the sending terminal, a search for a terminal capable of handling the Wi-Fi related function;
   selecting, by the sending terminal, a terminal found by the search as a receiving terminal;
   automatically generating a Personal Identification Number (PIN) code by the sending terminal;
   automatically establishing, by the sending terminal, a Wi-Fi channel to the receiving terminal by automatically sending to the receiving terminal a Probe Request message containing the generated PIN code, wherein the automatically establishing of the Wi-Fi channel comprises automatically sending, by the receiving terminal, a response message corresponding to the PIN code to the sending terminal;
   starting, by the receiving terminal, a timer after sending the response message;
   determining, when a message required for channel setup is not received from the sending terminal before an expiration of the timer, channel setup failure and sending, by the receiving terminal, a message indicating channel setup failure to the sending terminal;
   sending, by the sending terminal, data generated by the user function to the receiving terminal through the Wi-Fi channel; and
   outputting, by the receiving terminal, the received data.

2. The method of claim 1, wherein the selecting of the found terminal comprises one of:
   selecting a terminal found by the search according to an input signal from an input unit;
   selecting a terminal found by the search comprising a highest received signal intensity;
   selecting a most frequently used terminal found by the search; and
   selecting a most recently used terminal found by the search.

3. The method of claim 1, wherein a value of the timer is determined on a basis of an estimated transmission time of the response message from the receiving terminal to the sending terminal and an estimated transmission time of the required message from the sending terminal to the receiving terminal.

4. The method of claim 1, further comprising at least one of:
   outputting, after determining channel setup failure, by the receiving terminal, an alert indicating channel setup failure; and
   resuming, by the receiving terminal, a previous task according to scheduling information.

5. The method of claim 1, further comprising outputting, upon reception of the message indicating channel setup failure by the sending terminal, information of channel setup failure.

6. The method of claim 5, further comprising at least one of:
- resuming, by the sending terminal, a previous task after outputting the failure information; and
- outputting, by the sending terminal, pre-stored information on at least one found terminal after outputting the failure information.

7. A system of Wi-Fi terminals, the system comprising:
- a sending terminal for activating a Wi-Fi related function in response to a selection of a user function, and for automatically sending a message required for Wi-Fi channel setup to a terminal specified by a preset condition or by an input signal; and
- a receiving terminal for automatically responding to the message from the sending terminal to establish a Wi-Fi channel with the sending terminal, for receiving data of the user function from the sending terminal, and for outputting the received data,
- wherein the sending terminal automatically generates a Personal Identification Number (PIN) code and sends the PIN code to the determined receiving terminal,
- wherein the receiving terminal comprises a control unit for controlling an operation to send a response message corresponding to the PIN code to the sending terminal, and
- wherein the receiving terminal further comprises a timer that is started after the sending of the response message to the sending terminal in reply to the message from the sending terminal, and wherein the receiving terminal determines, when a message required for channel setup is not received from the sending terminal before an expiration of the timer, channel setup failure and sends a message indicating channel setup failure to the sending terminal.

8. The system of claim 7, wherein the sending terminal comprises at least one of:
- a storage unit for storing at least one of information of associations between user functions and Wi-Fi related functions and information of terminals collected from messages periodically broadcast by the terminals; and
- an input unit for generating an input signal for associating a user function with a Wi-Fi related function.

9. The system of claim 8, wherein the sending terminal further comprises a control unit for controlling an operation to determine a receiving terminal on a basis of the collected terminal information by selecting a terminal having a highest received signal intensity, by selecting a most frequently used terminal, by selecting a most recently used terminal, or by selecting a terminal according to an input signal from the input unit.

10. The system of claim 7, wherein the receiving terminal determines a value of the timer on a basis of an estimated transmission time of the response message from the receiving terminal to the sending terminal and an estimated transmission time of the required message from the sending terminal to the receiving terminal.

11. The system of claim 7, wherein the receiving terminal outputs, after determining channel setup failure, an alert indicating channel setup failure.

12. The system of claim 7, wherein the receiving terminal resumes a previous task according to scheduling information after determining channel setup failure.

13. The system of claim 7, wherein the sending terminal outputs, upon reception of the message indicating channel setup failure, information of the channel setup failure.

14. The system of claim 13, wherein the sending terminal resumes a previous task of the channel setup attempt after outputting the failure information.

15. The system of claim 13, wherein the sending terminal outputs pre-stored information of one or more terminals after outputting the failure information.

* * * * *